United States Patent
Davis et al.

(10) Patent No.: US 6,973,123 B2
(45) Date of Patent: Dec. 6, 2005

(54) SYSTEM AND METHOD FOR CONTROLLING LINE DRIVER POWER IN DIGITAL SUBSCRIBER LINE MODEMS

(75) Inventors: Gordon Taylor Davis, Chapel Hill, NC (US); Jeffrey Haskell Derby, Chapel Hill, NC (US); Evangelos Stavros Eleftheriou, Zurich (CH); Sedat Oelcer, Au (CH); Malcolm Scott Ware, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 09/814,044

(22) Filed: Mar. 21, 2001

(65) Prior Publication Data

US 2002/0136284 A1 Sep. 26, 2002

(51) Int. Cl.[7] .............................. H04B 1/38; H04L 5/16
(52) U.S. Cl. ....................................... 375/222
(58) Field of Search ............................... 375/222, 260; 370/465, 445

(56) References Cited

U.S. PATENT DOCUMENTS

| 5,805,597 A | * | 9/1998 | Edem ......................... 370/445 |
| 5,832,387 A | | 11/1998 | Bae et al. .................... 455/522 |
| 5,867,528 A | | 2/1999 | Verbueken ................... 375/222 |
| 5,903,608 A | | 5/1999 | Chun .......................... 375/260 |
| 5,933,454 A | | 8/1999 | Cioffi .......................... 375/260 |
| 6,028,486 A | | 2/2000 | Andre ......................... 330/297 |
| 6,061,427 A | | 5/2000 | Ryoo ............................. 379/1 |
| 6,351,509 B1 | * | 2/2002 | Vitenberg et al. ........... 375/377 |
| 6,567,473 B1 | * | 5/2003 | Tzannes ...................... 375/260 |
| 6,850,539 B1 | * | 2/2005 | Cassiers et al. ............. 370/465 |

FOREIGN PATENT DOCUMENTS

| JP | 60154736 | 8/1985 | ............. H04L 5/14 |
| JP | 06037591 | 2/1994 | .......... H03H 17/00 |
| JP | 07-143580 | 6/1995 | ............ H04Q 9/00 |
| JP | 08-223109 | 8/1996 | ............ H04B 7/26 |
| JP | 11308356 | 11/1999 | .......... H04M 11/00 |

* cited by examiner

*Primary Examiner*—Stephen Chin
*Assistant Examiner*—Curtis Odom
(74) *Attorney, Agent, or Firm*—Joscelyn G. Cockburn

(57) ABSTRACT

A low power DSL modem transmitter, suitable for incorporation in integrated DSLAM server line cards, transmits full power physical frames which include a control channel and a data field when data is available for transmission and physical frames having only a control channel or a control channel and a low power synchronization field when data is not available for transmission. And a method for controlling the total power dissipated in the integrated DSLAM by selectively restricting the flow of data packets to the DSLs.

5 Claims, 3 Drawing Sheets

Standard DSL Transmitter - Prior Art

SYSTEM AND METHOD FOR CONTROLLING LINE DRIVER POWER IN DIGITAL SUBSCRIBER LINE MODEMS

FIELD OF THE INVENTION

The present invention relates generally to communication systems and more particularly to a system and method for controlling the line driver power requirements of Digital Subscriber Line (DSL) transmitters and a method for controlling the total power dissipated by the line drivers of a plurality of DSL modem transmitters integrated on DSL server cards.

BACKGROUND OF THE INVENTION

Asymmetrical Digital Subscriber Line (ADSL) modems currently offer a high speed (up to 8 Mbps, depending on line conditions) alternative to analog modem technology for remote access connections. A typical prior art DSL Transmitter is illustrated in FIG. 1. The power dissipated in the line driver of the prior art DSL Transmitter presents a limiting factor in achieving higher levels of integration on Digital Subscriber Line Access Multiplexer (DSLAM) server line cards.

SUMMARY OF THE INVENTION

The invention contemplates a low power DSL modem transmitter, suitable for incorporation in integrated DSLAM sewer line cards, in which full power physical frames include a control channel signal component and a data signal component and low power physical frames include a control channel signal component and a low power synchronization signal component.

It is therefore an object of the subject invention to reduce the power requirements of the line driver of DSL server modems by limiting the bandwidth of the signal (and thus also limiting the power in the signal) transmitted to an associated client modem except when the client is intended to receive data (not idle) in the current physical frame. Note that the client modem must receive the control channel during every frame interval, in order to determine whether the rest of the data in a particular physical frame is to be received or discarded. Thus if the data is intended to be discarded by the client modem, the server modem may alter the signal sent by significantly attenuating that part of the signal which represents the data as long as doing so does not alter the contents of the control channel.

An additional object of the subject invention is that a subsystem controller or network processor may further control the line driver power within a group of such DSL modems by limiting the aggregate flow of data to a group of DSL server modem transmitters sharing a common physical package (i.e. chip or card).

Note that the features and advantages of the subject invention are focused on the downstream, central office DSLAM toward the remote Customer Premises Equipment (CPE) data path of the DSL connection, and as such may be implemented somewhat independently from the upstream (remote CPE toward DSLAM) functions. The central office/DSLAM transmitter contains the unique function required to implement the subject invention. However, the remote CPE DSL modem receiver recognizes physical layer frames which contain only control data, and alter processing during those time intervals accordingly.

DETAILED DESCRIPTION OF THE INVENTION

Figure 1:
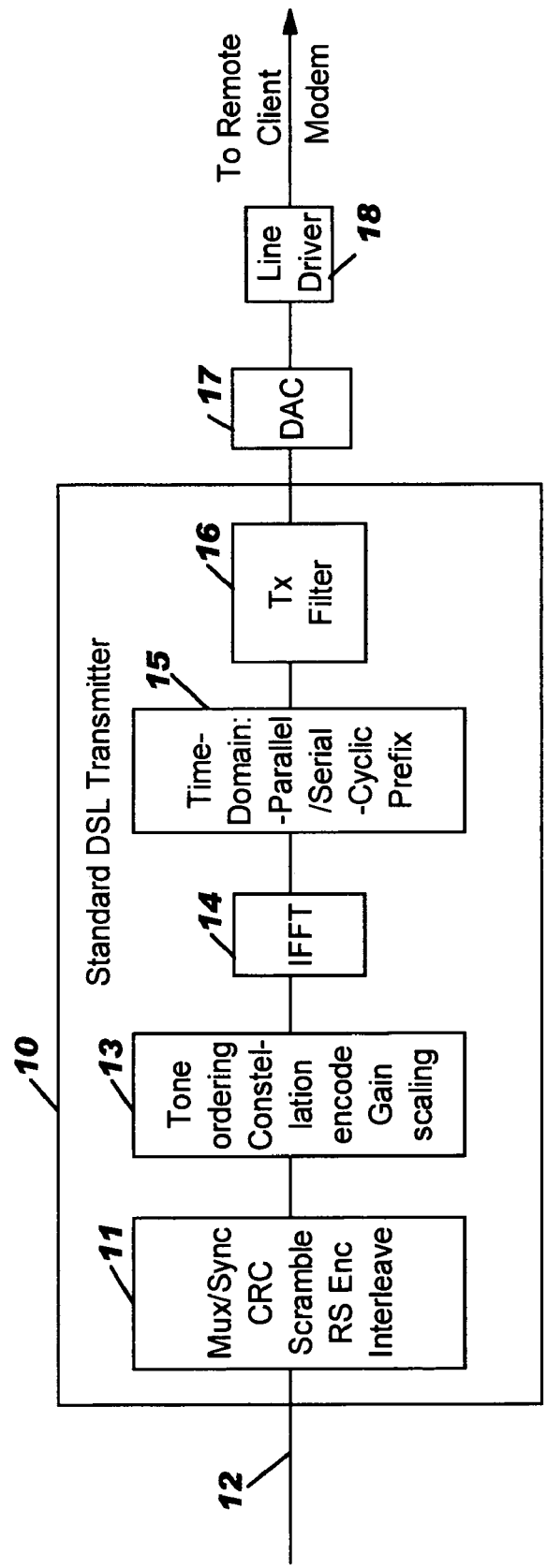
FIG. 1 is a block diagram of the transmitter portion of a prior art DSL modem.

In FIG. 1 the standard DSL modem transmitter 10 prepares physical frames suitable for transmission to a client modem via a DSL connection. The transmitter 10 includes a block 1 which receives signals from a source not shown via a cable 12. Block 11 provides a multiplexing function if required by the nature of the signals provided by the source. In addition it provides CRC generation, scrambling, Reed-Solomon encoding and interleaving. The output of block 11 is applied to block 13 which provides tone ordering, constellation encoding and gain scaling. An Inverse Fast Fourier transform (IFFT) circuit 14 provides its output to block 15 which provides a frame of time domain samples, serial to parallel conversion and cyclic prefix generation. The output of block 15 is applied in turn to a transmit filter 16, a digital to analog converter 17 and a line driver 18 which has its output connected to the DSL.

Data to be transmitted is partitioned into a series of blocks, where each data block consists of all data to be transmitted via a specific physical frame. A physical frame is defined as that portion of a sequence of time-domain samples of the signal transmitted over the line that results from one Inverse FFT operation in a DSL transmitter. The number of bits assigned to each block is a function of the bit rate negotiated for the link (e.g. number of tone frequency bands, complexity of modulation in each frequency band). Each block is further partitioned into a control field containing control data according to the operation of the subject invention, one or more fields containing user data, and one or more fields used for standard overhead and maintenance functions. The bits from each field are modulated to generate the corresponding signal components of the physical frame. This physical frame consists of a control channel signal component carrying control data from the control field, one or more data channel signal components carrying user data from corresponding user data fields, and possibly one or more overhead channel signal components carrying data to support various other overhead and maintenance functions. Note that in actual implementations various overhead and maintenance fields are transmitted in addition to user data fields, but within the context of the subject invention they can be considered equivalent to additional data fields.

Figure 2:
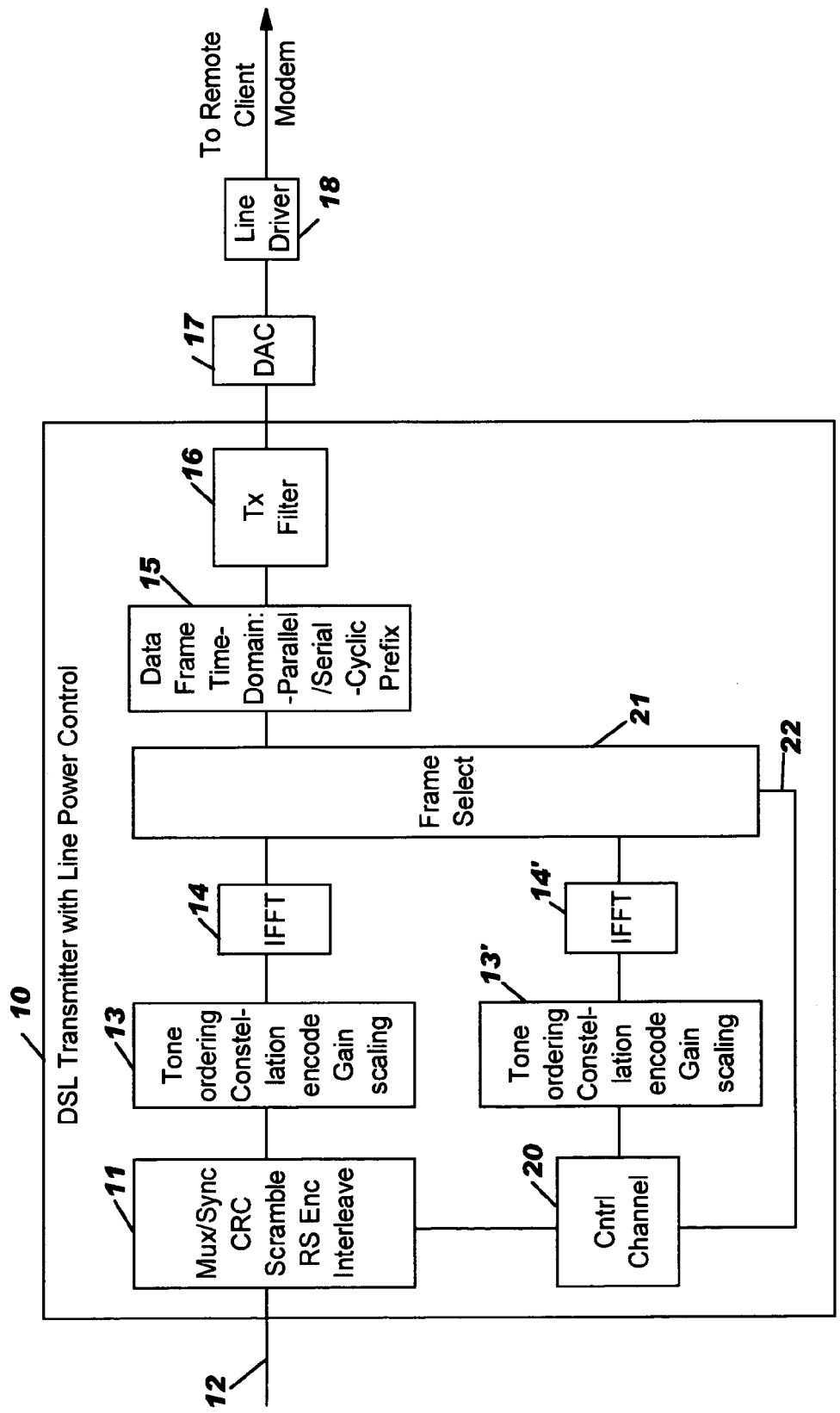
FIG. 2 is a block diagram of the transmitter portion of a DSL modem constructed according to the invention and suitable for integration in DSL server line cards; and, FIG. 3 is a schematic diagram of a DSLAM circuit card having a group of DSL modems mounted thereon.

Functional aspects of the subject invention may be understood by comparing FIG. 1 (Prior Art) with FIG. 2. Note that the functional blocks required to generate each data frame are similar in both FIGS. 1 and 2. However, instead of driving the client line with the same type of signal during every frame time, the subject invention creates a second frame type of time domain samples which contains a subset of the tones used for a full data frame. This is done by eliminating all tone frequency samples modulated with client data, leaving only a small subset of tones (those allocated to the control channel, in addition to those tones required to maintain timing within each remote client device, e.g. pilot tone) as input to a second Inverse FFT (IFFT). Note that it is the signal component from these control tones which is used by the client to determine whether or not a particular data frame is intended for the client. The client modem only requires modification to the extent that it can recognize the control channel and discard frames which do not contain data.

This is accomplished with the following additional components. A control channel generating circuit 20, in response to signals from block 11 (indicating that there is no data for transmission to the client), initiates the generation of a second physical frame which includes as a minimum a control channel which is identical in format to the control channel generated in block 11, when it has data to send to the client. In addition to the control channel it may, in most circumstance, be desirable to include a low power synchronization signal in the physical frame initiated in control channel 20. The second physical frame initiated in control channel 20 is applied to a block 13' which is structurally identical to block 13. The outputs of blocks 14 and 14' are selected for transmission by a frame selector 21 which is controlled by a control signal provided by control channel 20 over a conductor 22. The remainder of the transmitter is identical to the transmitter illustrated in FIG. 1.

In actual implementation, only one of the two IFFT computations is required for each physical layer frame interval, with the determination of which one to compute being made based on whether or not the modem has any data to send. In other words, the frame select function would select which IFFT to compute, rather than selecting which IFFT output to pass on to the next stage. Regardless of whether a control frame or a data frame is required for a particular physical frame interval, the same time-domain functions are required (e.g. parallel to serial conversion, cyclic prefix, etc.). Finally, a transmit filter is used to smooth transitions from one frame to the next. As is common practice in the industry, the transmit filter could alternatively be implemented in the analog domain, after the D-to-A converter.

Another alternate implementation option would be to define a low-power idle pattern for data tones in the control frame, instead of just setting the amplitudes of these tones to zero. Since constellation points are not equally spaced from the origin in the modulation of each tone, a subset of constellation points can usually be chosen which will average substantially less power than if the same tone evenly distributed its signal across all constellation points. This option may help the client receivers avoid issues relating to the dynamic transitions between data frames and control frames, and may facilitate continued tracking of timing and gain adjustments. Transmitter control functions may also be implemented to group multiple data frames to the client device prior to sending subsequent control frames in order to minimize the number of transitions each link experiences between data frames and control frames. Transmitter control functions may be additionally required to periodically send one or more data frames to the client device even if there is no data to send, in order to maintain timing recovery and gain adjustments in the client device. To accomplish this, the transmitter would fill one or more data frames with an idle pattern (e.g. scrambled ones) which offers an adequate signal to enable the client receiver to track the required parameters. Regardless of implementation options, the client receiver would compute signal-to-noise ratio (SNR) based on the signal power during reception of a data frame. Otherwise SNR computations might be misleading, and would potentially result in undesirable effects within the receiver. Some type of windowing of the received signal might also be useful in order to minimize the transient effects of boundaries between data frames and control frames.

Figure 3:
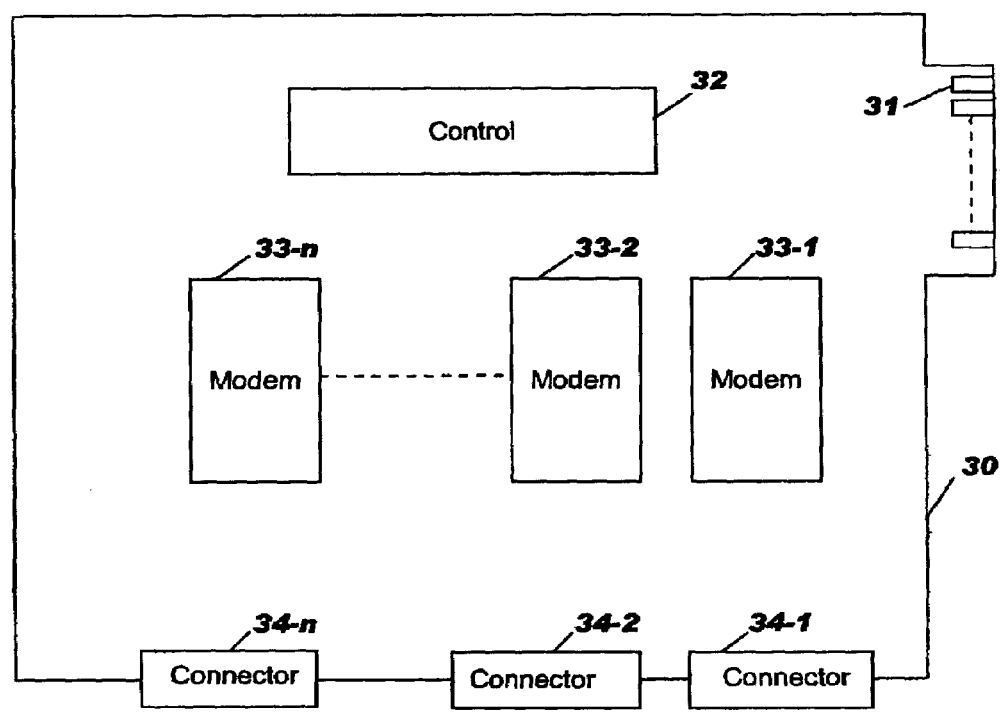

In FIG. 3 a DSLAM includes a circuit card 30 which has a plurality of contacts 31 for connection to a computer or system controller bus (not shown) over which data (for a plurality of DSLs connected to client modems not shown) is received. A subsystem controller or network processor 32 manages the flow of the received data to appropriate DSL modems 33-1 to 33-n which are connected to individual DSLs via connectors 34-1 to 34-n, respectively.

In order for these techniques to be effective in controlling worst-case power requirements, the subsystem controller or network processor 32 may further control the line driver power within a group of such DSL modems by limiting the aggregate flow of data to a group of DSL server modem transmitters 33 sharing a common physical package (i.e. chip or card) 30. This would be done in such a way as to insure the total power required from the power supply to power this common physical package, or alternately the total power dissipation in this common physical package is held below a predefined target power level. This target power level may be established based on physical limits of the chassis power supply, the power distribution busses connecting boards and chips to the power supply, air flow, cooling capabilities of the chassis, ambient temperatures supported, heat dissipation characteristics of the card and chip physical packages, or combinations of these and other related characteristics. If during a particular time interval, too many data packets were available for transmission to one or more DSL transmitters within a group, excess packets would be queued up for transmission at a later time. If such a situation continues to occur over an extended period of time, buffers and queues might start to fill, requiring various flow control mechanisms to be activated, which might result in discarded packets or back-pressure to the source of the packets.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural and/or functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

We claim:

1. In a communication system having a Digital Subscriber Line Access Multiplexer (DSLAM) including a plurality of DSL modems each having dual power capability in which each modem transmits a reduced power frame suitable to maintain synchronization when it has no data to transmit, a method for controlling the total power dissipated by the DSL modems comprising the following steps:
   monitoring the data transmission activity of the DSL modems;
   periodically calculating the power dissipated in the plurality DSL modems transmitting data;

comparing the calculated power dissipated to a predetermined value; and, reducing the total dissipated power by limiting the amount of data destined for selective DSL modems.

2. The method set forth in claim 1 in which the total dissipated power is reduced by buffering data destined for selective DSL modems.

3. The method set forth in claim 1 in which the total power is reduced by initiating a data flow control regime.

4. The method set forth in claim 1 in which the total power is reduced by selectively discarding physical data frames destined for selected DSL modems.

5. The method set forth in claim 1 in which the total power is reduced by applying back pressure to the data source.

* * * * *